Oct. 5, 1965      S. VALENTINO ETAL      3,209,449
BRAZING PROCESS AND ASSEMBLY EMPLOYING SPACING
ELEMENTS AND CAPILLARY-SIZED PASSAGES
Filed June 28, 1960

INVENTORS
Salvatore Valentino, Abraham I. Stern
and Albert J. Bradicich,

BY Diggins + LeBlanc

ATTORNEYS.

United States Patent Office 3,209,449
Patented Oct. 5, 1965

3,209,449
BRAZING PROCESS AND ASSEMBLY EMPLOYING SPACING ELEMENTS AND CAPILLARY-SIZED PASSAGES
Salvatore Valentino, Islip, Abraham I. Stern, Franklin Square, and Albert J. Bradicich, Huntington, N.Y., assignors to Fairchild-Hiller Corporation, a corporation of Maryland
Filed June 28, 1960, Ser. No. 39,378
11 Claims. (Cl. 29—484)

This invention relates to a process for joining layers of material and more particularly to an improved brazing process for joining or laminating a plurality of metal articles.

Much difficulty has been experienced in the lamination of metallic articles having a network of relatively intricate apertures and passageways terminating in the surfaces to be joined. Heretofore known methods have produced bonds prone to leakage due to voids in the brazed joint permitting interface communication between the various passageways of the joined surfaces. In addition, the brazing of surfaces of this type raised serious difficulties with regard to maintaining the passageways and apertures clear and free of brazing material, which tended to clog up the passageways by flowing into them during the brazing process when the joining layer was heated to the fluid state.

It has been previously suggested to join metallic elements by means of a bonding material having a melting point substantially below the melting point of the material to be joined, and at the same time predetermining the thickness of the bonding material by inserting spacer elements having a melting point substantially higher than the melting point of the bonding material. While resulting in a product having a bonding layer of predetermined thickness, the known methods have failed to provide for the complete cleaning of the material to be joined, failed to provide for the uniform heating of the surfaces to be joined, and provided no solution whatsoever to the problem of joining surfaces having a complex of passageways and cavities which in the resulting article communicate through the brazed joint.

The present invention provides an improved method for joining articles which permits a conventional brazing type salt flux to have access to clean all surfaces to be brazed just prior to and even during the brazing operation. Furthermore, the novel method of the present invention provides for the uniform heating of the entire brazing assembly and permits the assembly to be heated by the same salt flux utilized to clean the surfaces to be brazed. The resulting joint, therefore, is provided with increased strength and rigidity and at the same time a uniform joint of predetermined thickness can be formed.

The method and assembly of the present invention permits the bonding of surfaces in which the mating surfaces have passageways machined therein and assures a sound clean bond in the areas between the passageways to guarantee the inability of interpassage leakage. Capillary attraction prevents the bonding material from being forced into the machined passages, and aids in obtaining a good bond over a large surface area.

It is therefore a primary object of the present invention to provide a novel method of joining articles.

Another object of the present invention is to provide an improved method of brazing together metallic articles.

Another object of this invention is to provide an improved method of joining metallic articles having communicating apertures in the joined surfaces of the articles.

These and further objects and advantages of the invention will be more apparent upon reference to the following specification, claims and appended drawings wherein:

Figure 1:
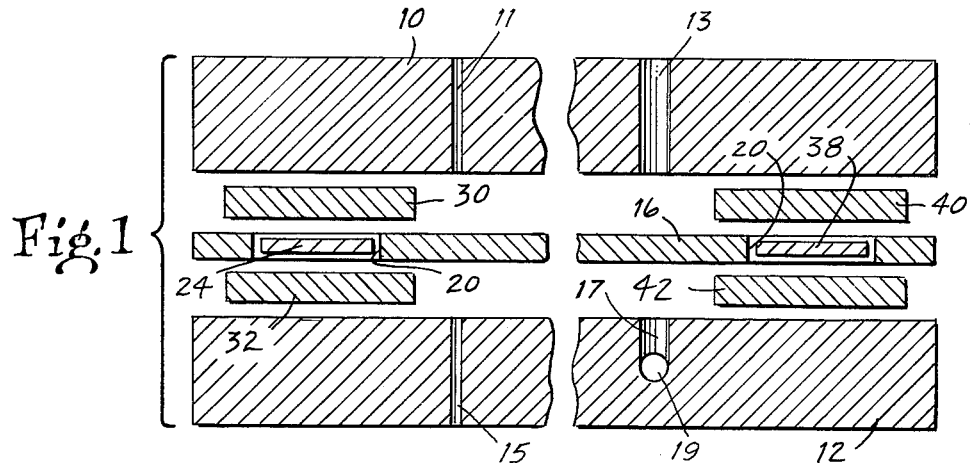
FIGURE 1 is a schematic diagram of a portion of a brazing assembly illustrating the novel joining method of the present invention.

Referring to the drawings, FIGURE 1 illustrates a pair of articles in the form of plates 10 and 12 which plates are to be joined together and are made from the parent metallic material. Plate 10 is provided with a pair of passageways 11 and 13 adapted to communicate for fluid flow with passageways 15 and 17 in lower plate 12. Passageway 17 communicates with a horizontal channel 19 indicated by dashed lines in FIGURE 4 terminating at the periphery of lower plate 12. It is apparent from FIGURE 4 that the channels 11, 13, 15 and 17 are only two of a plurality of communicating channels and passageways in the upper and lower plates which must be kept open during the brazing process so that they are in communication for the free flow of fluid when joined to form the final article of FIGURE 3.

Between the plates 10 and 12 is placed a sheet 16 of brading alloy material with the sheet 16 being between and spaced from parallel plates 10 and 12. While only two of the parent plates are shown it is apparent that a greater number of plates may be joined if so desired by the method of the present invention.

The brazing alloy sheet 16 is provided with a series of punch holes, two of which are indicated at 20 in alloy sheet 16. While only a pair of punched holes for the sheet 16 is shown it will be apparent that in practice a plurality of similar holes will be provided in each brazing sheet employed. Placed within the holes 20 are spacer discs as indicated at 24 and 38 which discs are made from a material having a higher melting point than the alloy sheet 16. The discs 24 and 38 are formed to have a thickness somewhat less than the thickness of the alloy sheet 16 in which they are retained, the thickness of the discs 24 and 38 being determined by the final spacing that is desired between the parent sheets 10 and 12 which are to be joined.

Spaced on each side of the aperture 20 are a pair of stand-off discs or blocks such as the blocks 30 and 32 on opposite sides of spacer disc 24 and stand-off blocks 40 and 42 on opposite sides of spacer disc 38. The stand-off discs or blocks are made from the same material as the brazing alloy sheet 16 with which they abut and are formed slightly larger than the apertures 20 so that the stand-off discs overlap the apertures to space the plates of parent material 10 and 12, from the sheet 16 of brazing alloy. While the various elements have been described as blocks or discs it is apparent that they may take any suitable shape, the only requirement being that the spacer elements 24 and 38 be not too much thicker than the alloy sheet 16 in which they are enclosed and preferably be somewhat thinner. The other requirement is that the stand-off blocks be too large to fit in the apertures 20 so that they serve to space the materials and to substantially cover the spacer elements 24 and 38 on both sides.

Figure 2:
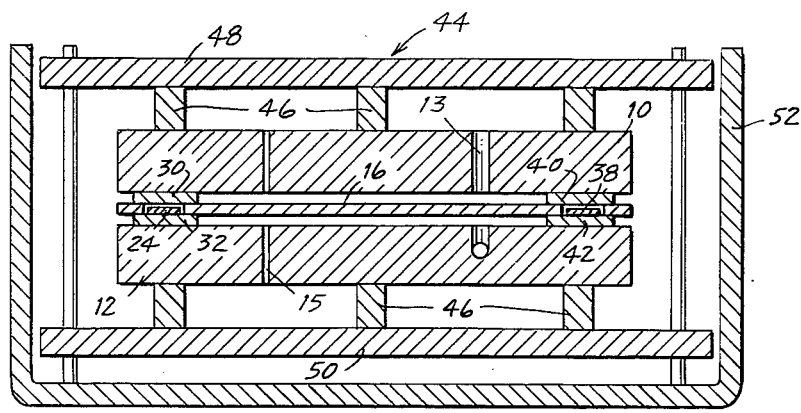
FIGURE 2 shows an entire assembly of the type illustrated in FIGURE 1 as incorporated in a flux bath.

FIGURE 2 shows an assembly according to the present invention embodying the parent plates 10 and 12 enclosing the brazing alloy sheet 16 as incorporated in a flux bath. In addition to spacer element 24 and stand-off pieces 30 and 32, FIGURE 2 shows the second similar set including spacer 38 and stand-off pieces 40 and 42 formed in the manner already described. The entire assembly is clamped in a brazing fixture generally indicated at 44 including pressure elements 46 and back-up plates 48 and 50. Surrounding the brazing fixture 44 is a container or flux tub 52.

The assembly is clamped in the brazing fixture 44 which fixture is designed to exert a compressive load at both room temperature and at elevated temperatures. The tub 52 is filled with a conventional salt flux so that entire assembly is immersed in the salt bath in the manner shown in FIGURE 2 and then placed in a brazing furnace.

When the assembly is immersed in the salt bath the stand-off pieces such as pieces 30, 32, 40 and 42 in FIGURE 1, for example, allow free access of molten salt flux to all surfaces of the assembly providing cleaning of all the surfaces and uniform heating of the entire assembly. When the brazing alloy sheets such as sheet 16 reaches the melting point in a suitable brazing furnace the brazing alloy starts to flow under the influence of the combined effect of compression from the brazing fixture and capillary action. This accumulative effect acts to squeeze or push the salt flux from between the surfaces and further provides a joining of the parent material with the brazing alloy sheets to provide a brazed joint. The amount of brazing alloy squeezed from between the surfaces of the parent plates 10 and 12 due to the compressive load of the fixture is limited by the spacer elements 24 and 38 which act as stops.

Figure 3:
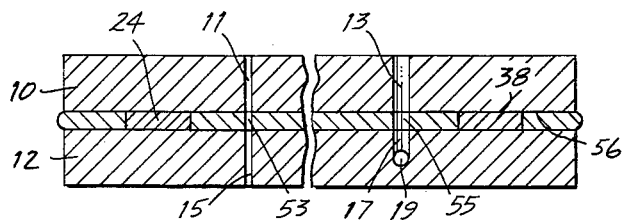
FIGURE 3 illustrates a portion of a final article joined in the manner of the present invention.
Figure 4:
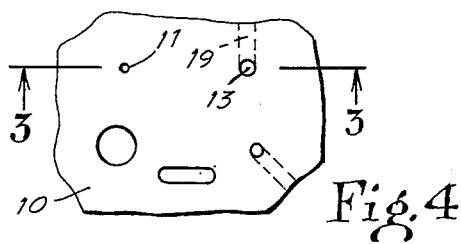
FIGURE 4 is a plan view of the joined article of FIGURE 3.

FIGURE 3 shows a resulting article formed from the assembly of FIGURE 2. As can be seen in FIGURE 3, the parent plates 10 and 12 are joined by an intermediate brazing alloy layer 56 of uniform thickness determined by the spacer elements 24 and 38. The stand-off elements 30 and 32, 40 and 42 have fused with the intermediate sheet 16 to form the layer 56.

Because of the fact that sheet 16 is spaced from plates 10 and 12 by the stand off blocks the sheet upon melting does not draw into passageways such as 11, 13, 15 and 17 but rather is drawn by capillary attraction to the unapertured portions of the joined surfaces of plates 10 and 12. The result is that in the final article shown in FIGURE 3 intermediate layer 56 exhibits apertures 53 and 55 which permit communication between passageways 11 and 15 on the one hand and 13 and 17 on the other. The capillary attraction is dependent upon the thorough cleaning of the adjacent surfaces and depends upon the initial spacing between intermediate sheet 16 and joined plates 10 and 12 to cause the material to be drawn to the solid surfaces and away from the ends of the communicating passageways.

By way of example only, in one construction assembled in accordance with FIGURE 2, the parent sheets 10 and 12 were joined by a brazing alloy sheet 16 having a thickness ranging from .0076 to .0080 inch. The stand-off elements were all formed with a thickness of .004 inch and the spacer elements 24 and 38 were made from a high melting point material having a thickness of .002 inch. The brazing temperature of the salt flux in the example given was 1135 degrees F.

It is apparent that the present invention provides a novel method for joining various materials substantially improving over known brazing or laminating methods. The process of the present invention insures that all of the following conditions essential to a sound braze joint are effected (a) the salt flux is permitted access to clean all surfaces to be brazed (b) the flux bath may be utilized as the heat source to uniformly heat the entire brazing assembly (c) when the brazing alloy starts to flow the salt is forced out from between the surfaces to be joined by the compressive action of the brazing fixture and (d) a given thickness of brazing alloy remains between the surfaces dependent upon the thickness of the spacers between the plates.

While specific dimensions have been given, it will be understood that they are by way of example only and that various sizes as well as variations in specific materials may be incorporated without departing from the concept of the present invention.

The sizes may be modified in accordance with the limitations given and conventional brazing materials may be employed. The thickness and size of the individual elements varies with the area of the surfaces to be joined and the number, size and location of the openings in the surfaces.

By means of the improved process of the present invention it is possible to braze a joint over a large surface area and to join parts having all types of openings and passageways. The possibility of interface leakage is eliminated since the joint is completely free of voids. While flat sheets are shown the present invention may also be utilized to join two or more articles having curved surfaces forming a wide variety of configurations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A brazing assembly comprising a plurality of articles to be joined, an essentially continuous layer of brazing material between the opposed faces of each pair of said articles, said brazing layer including a plurality of spacer elements of higher melting point material than said brazing material, and separates stand off elements of brazing material and of materially lesser area than said layer spacing said brazing layer from the surfaces of said articles and leaving open passages of capillary size between each brazing material layer and the adjacent faces of the corresponding articles.

2. An assembly according to claim 1 wherein said articles are incorporated in a pressure jig for applying a compressive force to said articles.

3. A brazing assembly comprising a pair of articles to be joined, an essentially continuous layer of brazing material between said articles, said brazing layer having spaced apertures, a spacer element received within each of said apertures of higher melting point material than said brazing material, and separate stand off elements of brazing material covering the opposite ends of each of said apertures said stand off elements providing open passages of capillary size between said layer of brazing material and the adjacent faces of the articles to be joined.

4. An assembly according to claim 3 wherein said spacer elements are smaller than said apertures.

5. An assembly according to claim 4 wherein said spacer elements are thinner than said brazing layer.

6. An assembly according to claim 5 wherein said articles are retained in a pressure jig for applying a compressive force to said articles.

7. An assembly according to claim 6 wherein said jig is submerged in a salt flux bath in a brazing furnace.

8. An assembly according to claim 7 wherein said articles are flat metallic sheets.

9. A method of joining articles comprising spacing a pair of articles to be joined on the opposite sides of a layer of brazing material, said layer including a plurality of spaced apertures, inserting spacer elements of higher melting point material than said brazing layer in said apertures, covering the opposite ends of said apertures with stand off blocks of brazing material said stand off elements providing capillary sized passages between said brazing material layer and the articles to be joined, the passages extending over a major portion of the area of said layer of brazing material, placing said articles in a compressive jig, immersing said jig in a molten salt flux bath at a temperature lower than brazing temperature, heating said bath to brazing temperature and thereafter removing said jig from said bath.

10. A method according to claim 9 wherein said jig in said bath is placed in a brazing furnace to heat said bath to brazing temperature.

11. A method according to claim 9 wherein the articles to be joined are provided with aligned passages extending substantially at right angles to the opposed faces of the articles and wherein said apertures, spacer elements, and stand off blocks are spaced from the aligned passages along the opposed faces of the articles.

References Cited by the Examiner

UNITED STATES PATENTS

| | | | |
|---|---|---|---|
| 344,120 | 6/86 | Makin | 29—497 X |
| 2,195,314 | 3/40 | Lincoln | 29—501 |
| 2,268,369 | 12/41 | Askin | 29—501 X |
| 2,274,550 | 2/42 | Karmazin | 29—503 X |
| 2,406,310 | 8/46 | Agule | 29—591 X |
| 2,437,212 | 3/48 | Schottland. | |
| 2,443,574 | 6/48 | Burns | 29—490 |
| 2,451,099 | 10/48 | La Motte | 29—487 |
| 2,530,552 | 11/50 | Stoddard | 29—501 X |
| 2,694,852 | 11/54 | Rogers | 29—472.1 X |
| 2,713,196 | 7/55 | Brown | 29—472.3 X |
| 2,741,932 | 4/56 | Whitney et al. | 29—501 X |
| 2,809,423 | 10/57 | Hannink | 29—504 X |
| 2,871,887 | 2/59 | Obrebski et al. | 29—504 X |
| 2,882,116 | 4/59 | Williams | 29—501 X |
| 3,056,195 | 10/62 | Hack | 113—110 X |
| 3,069,766 | 12/62 | Rush | 29—510 X |
| 3,070,880 | 1/63 | Davis et al. | 29—497.5 X |
| 3,119,418 | 1/64 | Rayniak | 29—472.3 X |

JOHN F. CAMPBELL, *Primary Examiner.*

WHITMORE A. WILTZ, *Examiner.*